Oct. 21, 1969     T. R. STOCKTON     3,473,413
ENGINE AND TRANSMISSION ASSEMBLY
Filed March 21, 1968     5 Sheets-Sheet 1

INVENTOR:
Thomas R. Stockton
BY
ATTORNEYS.

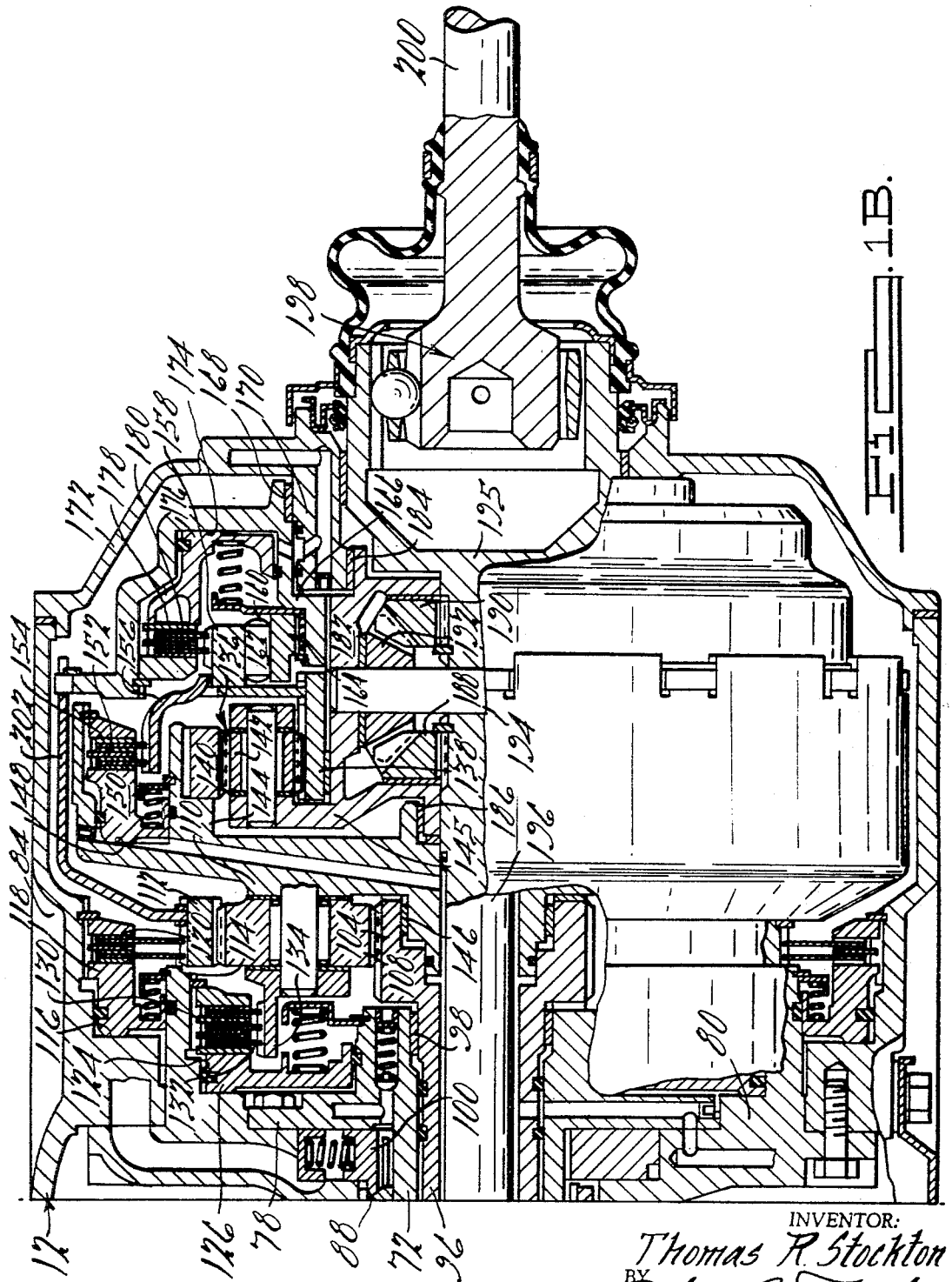

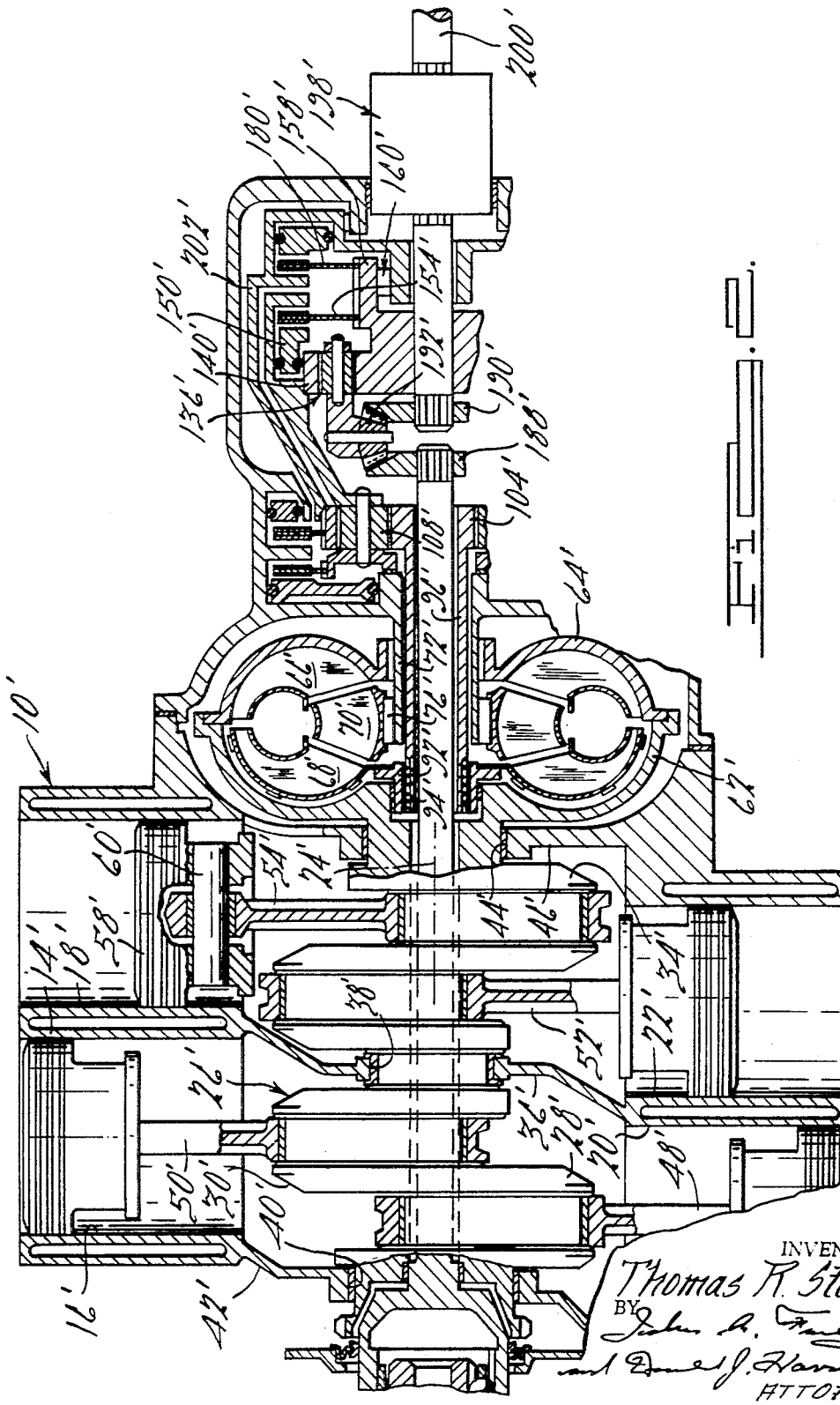

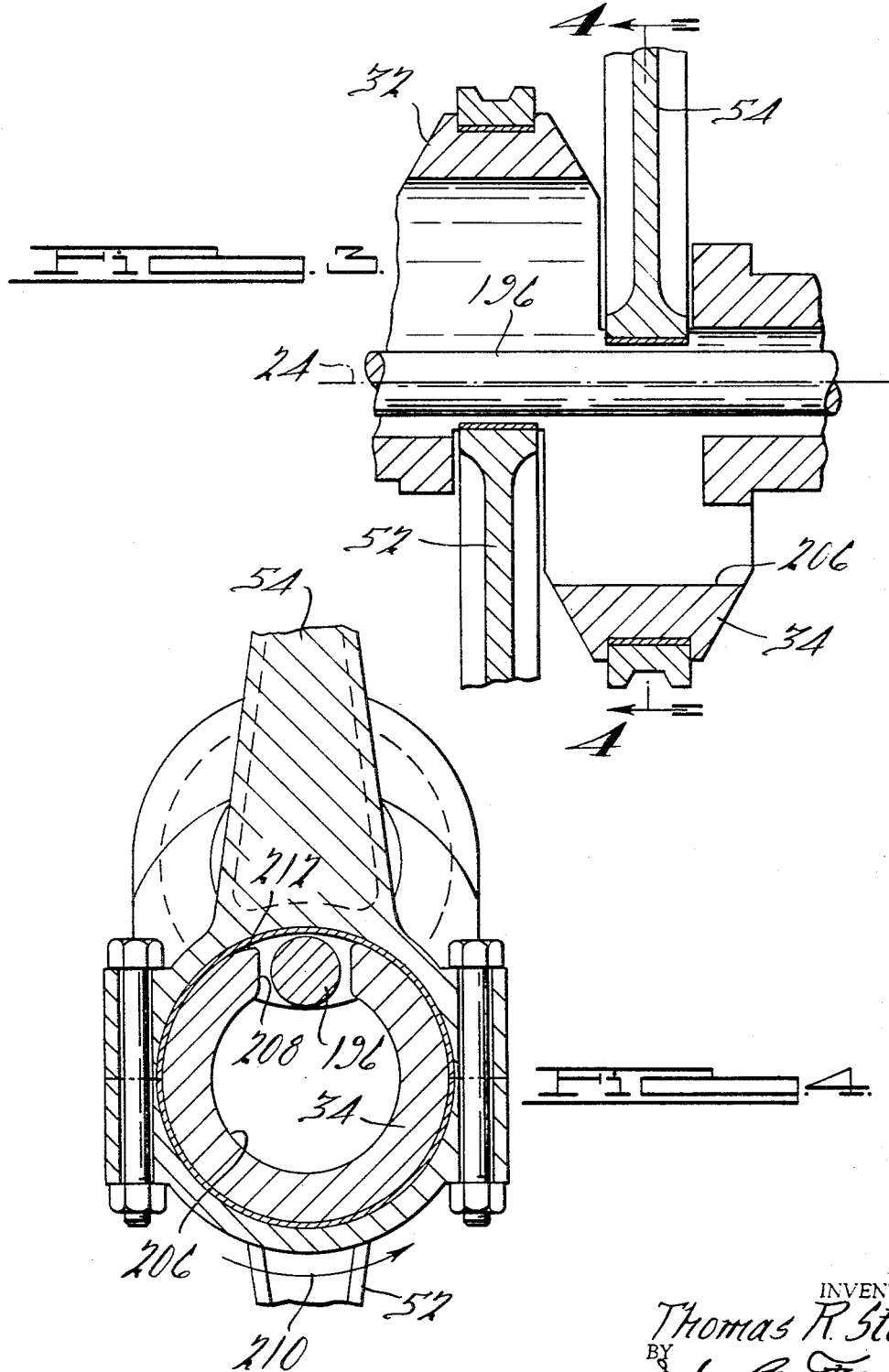

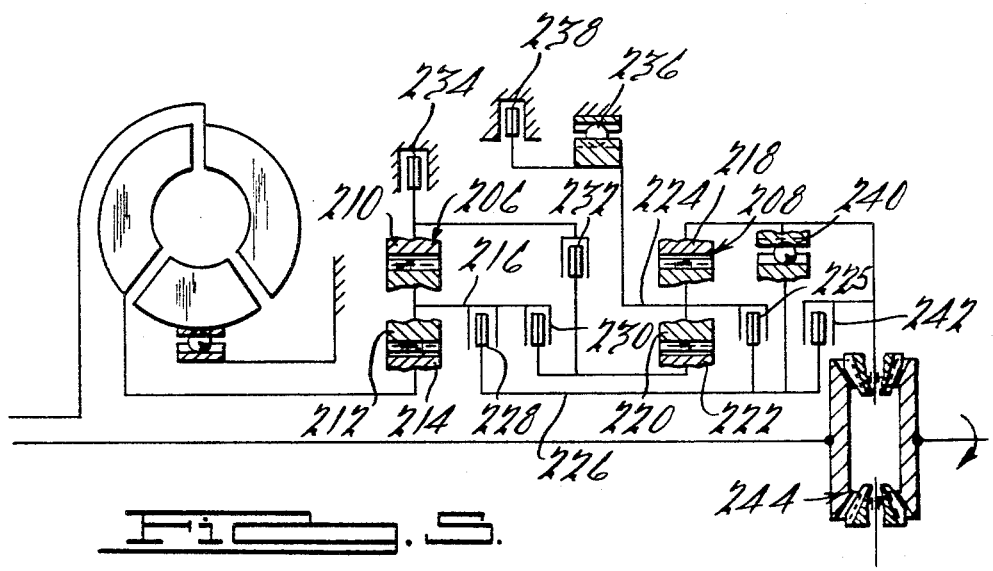
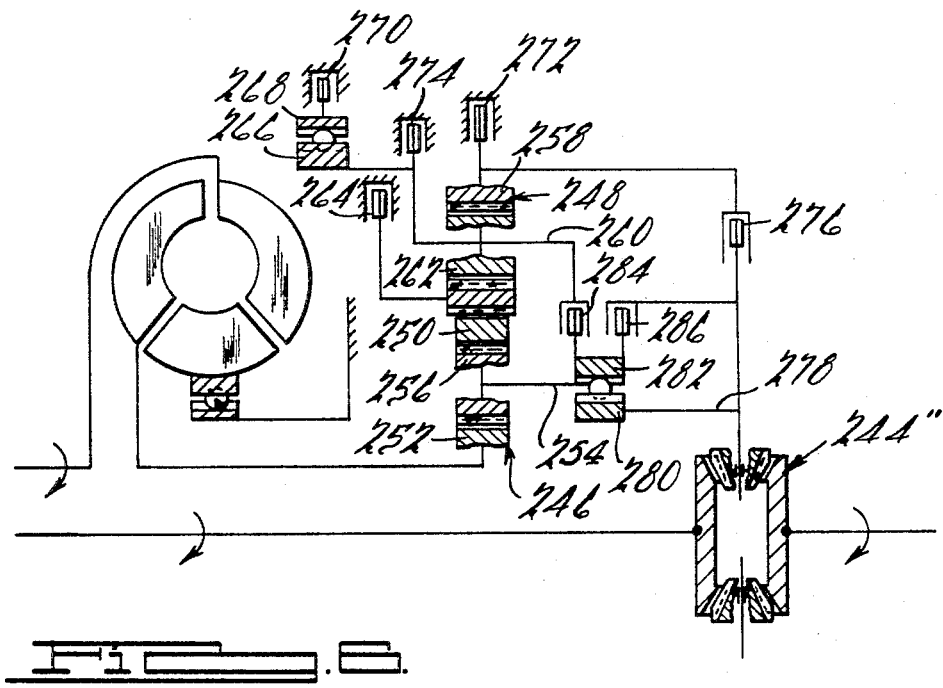

United States Patent Office 3,473,413
Patented Oct. 21, 1969

3,473,413
ENGINE AND TRANSMISSION ASSEMBLY
Thomas R. Stockton, Ann Arbor, Mich., assignor to Ford Motor Company, Dearborn, Mich., a corporation of Delaware
Filed Mar. 21, 1968, Ser. No. 714,886
Int. Cl. F16h 37/08
U.S. Cl. 74—695                                                    13 Claims

ABSTRACT OF THE DISCLOSURE

This invention comprises an engine and transmission assembly for a torque delivery driveline wherein the engine includes a crank shaft that is connected directly to the impeller shell of a hydrokinetic torque converter, the latter forming a portion of the torque delivery path between the crankshaft and driven portions of the mechanism.

The driven portions include output shafts for differential gearing, one shaft extending through the hydrokinetic torque converter and through the crankshaft.

BRIEF SUMMARY OF THE INVENTION

This invention relates generally to drivelines for automotive vehicles. It relates particularly to an automotive vehicle driveline in which the vehicle engine and the torque transmitting mechanism are situated for rotation about a common axis that is transverse with respect to the fore-and-aft axis of the vehicle. It can be applied readily to a front-wheel-drive vehicle wherein the vehicle's dirigible wheels are connected drivably through universal joints to each of the two driven shafts of the mechanism. These shafts are connected drivably to differential side gears for the differential gearing unit, the input element of the differential gearing unit forming the torque output member of the transmission gearing.

A principal feature of my invention resides in the compact arrangement of the torque transmitting elements. The structural characteristics that give rise to this feature include the integration of the torque converter impeller and the internal combustion engine crankshaft and also the concentric arrangement of one of the two differential torque delivery shafts with respect to the crankshaft itself.

According to one embodiment of my invention, a simplified, two-speed ratio planetary gearing arrrangement is used to establish a torque delivery path between the turbine of the hydrokinetic unit and the torque input carrier of the differential gear unit. In other embodiments the torque transmitting gearing provides four forward-driving speed ratios, rather than two. I expect that the elements of the gearing can be arranged in axially spaced relationship to provide a minimum transverse dimension of the driveline with respect to the output shaft axis. In the alternative the elements of the gearing can be arranged in concentric fashion to produce a minimum axial dimension when measured in the direction of the output shaft axis.

BRIEF DESCRIPTION OF THE FIGURES OF THE DRAWING

FIGURE 1A and FIGURE 1B show in longitudinal, cross-sectional form an engine and transmission assembly embodying the features of my invention.

FIGURE 1B forms a continuation of the structure of FIGURE 1A.

FIGURE 2 is a schematic representation of the structure shown in FIGURES 1A and 1B.

FIGURE 3 is an enlarged view of a portion of the crankshaft of FIGURE 1A.

FIGURE 4 is a cross-sectional view taken along the plane of section line 4—4 of FIGURE 3.

FIGURE 5 is a schematic representation of an alternate gearing arrangement which provides four forward-driving speed ratios rather than two forward-driving speed ratios as in the FIGURE 2 construction.

FIGURE 6 is a schematic representation of a third embodiment of the invention showing a four speed-ratio gearing unit with the elements of the gearing situated concentrically as opposed to the axial disposition of the elements in the FIGURE 5 construction.

PARTICULAR DESCRIPTION OF THE INVENTION

Figure 1A:
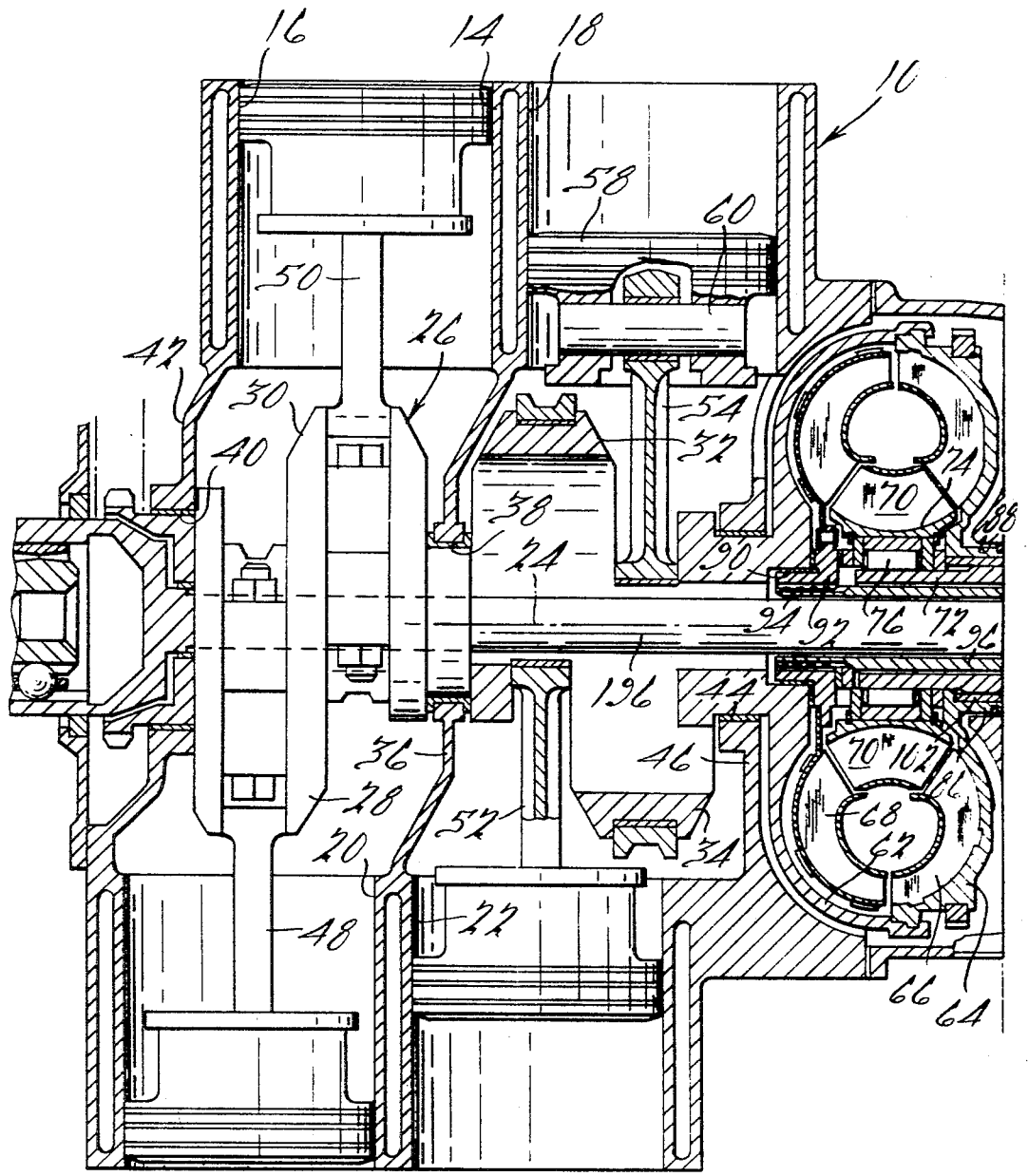

In FIGURES 1A and 1B numeral 10 indicates generally a four cylinder internal combustion engine for an automotive vehicle driveline. Numeral 12 indicates generally a hydrokinetic power transmission mechanism, which is formed as part of an assembly that includes also the engine 10.

Engine 10 includes a cylinder block 14 in which is formed cylinders 16, 18, 20 and 22. These are arranged in radial disposition with respect to the axis 24 of an engine crankshaft designated generally by reference character 26.

Crankshaft 26 includes a first crank portion 28 and a second crank portion 30 situated 180° out of phase with respect to the first crank portion 28. Crankshaft 26 includes also a second set of crankshaft portions, as shown at 32 and 34. These also are situated 180° out of phase. A crankshaft bearing support wall 36 is situated between the crank portions 30 and 32. A crankshaft bearing is provided for the crankshaft 26 within bearing opening 38 formed in the wall 36. The left-hand end of the crankshaft 26 is received through bearing opening 40 formed in end wall 42 for the cylinder block. The right-hand end of the crankshaft is journalled within the bearing opening 44 formed in end wall 46 of the cylinder block.

Piston rods 48, 50, 52 and 54 are situated, respectively, in cylinders 20, 16, 22 and 18. A piston 58 is connected to its associated piston rod 54 by means of a crank pin 60. A corresponding piston is associated with each of the other piston rods.

Piston rod 48 is connected to the crank portion 28, bolts 56 being provided for this purpose. The radially inward ends of crankshafts 48, 50, 52 and 54 are journalled, respectively, on the crank portions 28, 30, 32 and 34.

The right-hand end of the crankshaft 26 is connected to and is formed with an impeller shell part 62 of semi-toroidal shape. The periphery of the shell part 62 is connected to shell part 64. The two parts cooperate to define a closed cavity.

Impeller blades 66 are secured within the interior surface of the shell part 64. A bladed turbine 68 located within the cavity of the impeller shell is arranged in toroidal fluid flow relationship with respect to the impeller blade 66. A bladed stator 70 is situated in the torus circuit between the flow exit section of the turbine and the flow entrance section of the impeller blades.

The stator is mounted on a stationary stator sleeve shaft 72, which extends concentrically through the hub 74 of the stator 70. Located within a central cavity in the hub 74 is an overrunning brake 76 which inhibits rotation of the stator 70 in one direction, but permits free-wheeling motion in the opposite direction.

Stator sleeve shaft 72 is flanged at 78 to permit a bolted connection with a transverse wall 80. This wall in turn is secured at its periphery 82 to a shoulder formed on transmission housing 84. The housing is bolted or otherwise secured to the right-hand end of the cylinder block for the engine 10.

A hub 86 formed on the impeller shell part 64 is received within a central opening 88 in the wall 80. To permit sealing between the interior of the housing 12 and the interior of the torus cavity, the hub of the impeller shell part 62 is formed with a pilot bearing opening 90 which receives rotatably therein a turbine hub 92 which is secured to the turbine 68. Hub 92 is splined at 94 to a central turbine sleeve shaft 96. The right-hand end of the sleeve shaft 96 is journalled by bushing 98 within the stationary stator sleeve shaft 72.

A positive displacement pump, preferably a slipper pump 100, is received within the pump cavity formed in the wall 80. Its rotor is drivably connected by a suitable drive connection, such as the sleeve 102, to the impeller hub. Pump 100 forms a pressure source for operating the various pressure actuated clutch and brake servos.

A power input sun gear 104, which forms a part of a planetary gear unit 106, is connected directly to the turbine shaft 96. It meshes with planet pinions 108 journalled rotatably on carrier 110. Pinions 108 engage ring gear 112 which is internally splined to carry brake disc 114. The interior of the housing 84 and the wall 80 cooperate to define an annular cylinder 116 within which is positioned an annular brake piston 118. When fluid pressure is admitted behind the piston 118, it causes the discs 114 to engage frictionally the brake separator plates 120 splined to the interior of the housing 84. The braking force of the piston 118 is taken by back-up plate 122.

Wall 80 defines an annular cylinder 124 within which is positioned an annular brake piston 126. Brake discs 130 are carried by the internally splined periphery of the cylinder 124. These cooperate with discs 132 carried by an externally splined clutch element 134 which forms a part of the carrier 110. When fluid pressure is admitted behind the piston 126, the brake shown in part at 130 and 132 anchors the carrier 110 to the housing.

A second planetary gear unit 136 includes a sun gear 138 and a ring gear 140. Planet pinions 142 drivably engage ring gear 140 and sun gear 138. These pinions are journalled rotatably on pinions suported by planetary carrier 145. Ring gear 140 is connected to a clutch drum 144 which in turn is connected directly to carrier 110. The common hub for the carrier 110 and the clutch drum 144 is journalled within a pilot bearing opening 146 formed in sun gear 104. Clutch drum 144 is formed with an annular cylinder 148 which receives an annular piston 150. Clutch plates 152 are splined to the internal periphery of the cylinder 148. These frictionally engage friction clutch discs 154 as fluid pressure is admitted to the cylinder 148. Discs 154 are carried by clutch element 156, which is secured directly to outer race 158 of an overrunning clutch 160. Preferably the clutch 160 includes rollers 162 which are situated between race 158 and an inner race 164. The race 158 can be cammed to permit one-way rotation of the race 158 with respect to the race 164, but relative rotation in the opposite direction is inhibited.

Race 164 is splined to clutch drum 166, which is journalled by bushing 168 on a stationary support sleeve 170 carried by an end plate 172. Plate 172 is secured at its periphery to the end of the housing 84.

Clutch drum 166 is formed with an annular cylinder 174 which receives an annular piston 176. The piston is adapted to engage clutch plates 178 splined to the interior periphery of the drum 166, thereby establishing a driving, frictional connection with clutch plates 180 splined to the outer race 158 of the overrunning coupling 160.

The carrier 145 is connected directly to differential carrier 182. This is journalled by means of a bushing 184 within the stationary sleeve 170. It is journalled at its opposite end by a second bushing 186 received within a bearing opening formed in the carrier 110.

Differential carrier 182 encloses a pair of differential side gears 188 and 190. These drivably engage differential pinions 192 which are journalled rotatably on pinion shafts 194 supported by differential carrier 182.

A first power output member 195 is connected directly to the side gear 190. A second power output member in the form of a shaft 196 is connected directly to the side gear 188. Shaft 196 extends coaxially through the torque converter and through the turbine sleeve shaft 96.

The universal joint 198 connects drivably the power output member 195 with a traction wheel driveshaft 200. A similar coupling connects the outboard end of shaft 196 to a second traction wheel driveshaft, not shown.

The periphery of the clutch drum 166 is connected drivably to the ring gear 112 through a drive shell 202. The clutch element 156, in addition to being connected to the outer base 158 of the clutch 160, is connected drivably to sun gear 138.

The crankshaft 26 has formed therein a longitudinal central opening 204 to which shaft 196 extends. As best indicated in FIGURES 3 and 4, the crank portion 34 is formed with a hollow interior 206. The eyelet portion of the piston rod 54 encircles the crank portion 206, the latter being in the form of an annular wall having a discontinuity at 208. The shaft 196 extends through the wall at the location of the discontinuity 208. It is possible with this construction to locate the geometric axis of the crank portion 34 as close as possible to the axis 24 of the crankshaft without reducing the so-called "throw" or displacement of the piston rod as the crankshaft rotates.

In FIGURE 4 the crankshaft rotates in the direction of the arrow 210.

Located between the inner periphery of the bearing within the pilot portion of the piston rod and the exterior surface of the crank portion 34 is a lubrication oil ramp 212. Oil for lubrication purposes becomes wedged in the ramp upon rotation of the crankshaft thereby facilitating lubrication of the piston rod bearings.

A similar construction is provided for each of the other crank portions.

During low speed ratio operation, the brake, shown in part at 120, is actuated. This anchors the ring gear 112. Turbine torque then is distributed through shaft 96 to the sun gear 104. The ring gear 112 acts as a reaction member, and the carrier torque of gear unit 106 is distributed directly to ring gear 140. Carrier 144 acts as a power output member as sun gear 138 is braked against rotation by the overrunning clutch 160. The drum 166 at this time is anchored by the engaged brake shown in part at 120. The torque ratio obtained at this time is equal to the quantity $$\left(1+\frac{R1}{S1}\right)\left(1+\frac{S2}{R2}\right)$$

To obtain high speed ratio the brake shown in part at 120 again is applied and in addition the friction clutch shown in part 154 is applied. Turbine torque again is delivered to the sungear 104 and ring gear 112 again acts as a reaction member. The output torque on the carrier 110 is distributed through the clutch shown in part at 152. This clutch locks up the planetary gear unit 136 by connecting together the ring gear 140 and the sun gear 138. The output torque then is distributed directly to the differential carrier 182 from the carrier 110. The torque ratio is represented at this time by the equation $$\left(1+\frac{R1}{S1}\right)$$

Reverse ratio is achieved by engaging the friction brake shown in part at 130 and by releasing the friction brake shown in part at 120. The brake shown in part at 180 also is applied. Under these circumstances the carrier 110 acts as a reaction member and the ring gear 112 is driven in a reverse direction as the turbine drives sun gear 104. The reverse motion of the ring gear 112 is distributed through drive shell 202 and through the engaged clutch, shown in part at 180, to the sun gear 138. The ring gear 140 acts as a reaction member since it is connected directly to the anchored carrier 110. The carrier 144 and the differential carrier 182 thus are driven in a reverse direction. The torque ratio during reverse drive is equal to $$\left(\frac{R1}{S1}\right)\left(1+\frac{R2}{S2}\right)$$

The clutch shown in part at 180 may be useful also during hill braking operation when the transmission is conditioned for forward drive, low speed ratio operation. At this time the clutch bypasses the overrunning clutch 160.

In FIGURE 5 I have shown an embodiment of my invention which is capable of establishing four forward driving speed ratios with the use of six friction torque establishing devices. The gearing system shown in schematic form in FIGURE 5 would be used in lieu of the schematic gearing representation of FIGURE 2. Other features of the FIGURE 2 construction would be common to the FIGURE 5 construction. Similar reference characters are used with FIGURES 2 and 5 constructions where a designated member is common to both.

The gear unit in FIGURE 5 includes two simple planetary gear units 206 and 208. Gear unit 206 includes a ring gear 210, planet gears 212, a sun gear 214 and a planet carrier 216 upon which planet gears 212 are journalled. Gear unit 208 includes a ring gear 218, planet gears 220, a ring gear 222 and a planetary carrier 224 upon which planet gears 220 are journalled. A selectively engageable friction clutch 225 connects drivably sleeve shaft 226 with the carrier 224 during second speed-ratio operation and fourth speed-ratio operation. Another friction clutch 228 connects drivably the sleeve shaft 226 with the carrier 216 during operation in each of the four forward driving speed-ratios.

Clutch 230 connects drivably the sun gear 222 with the carrier 216. During reverse drive operation, friction clutch 232 connects drivably the sun gear 222 and the ring gear 210 during operation in each of the four forward driving speed-ratios.

A friction brake 234 is adapted to anchor the ring gear 210 during operation in reverse drive and during operation in the third and fourth forward driving speed-ratios. An overrunning brake 236 establishes one-way braking action for the carrier 224 during operation in the first and second forward driving speed-ratios. A companion brake 238, which is capable of accommodating torque reaction in either direction, is engaged during reverse drive and during hill braking operation in the first speed ratio.

Overrunning clutch 240 establishes a one-way driving connection between sleeve shaft 226 and ring gear 208 during operation in the first and the third forward driving speed-ratios. The overrunning clutch 240 can be bypassed, however, by a selectively engageable friction clutch 242 to establish hill braking operation in the third and in the first forward driving speed-ratio.

Ring gear 208 is connected drivably to the carrier. Forward differential gear unit 244 forms a counterpart for the differential gear unit of the FIGURE 2 construction.

Forward drive, low speed ratio operation is achieved by engaging clutch 228 and 232. Clutch 228 remains applied during operation in each of the four forward drive speed ratios.

Turbine torque is delivered directly to the sun gear 214. The resulting forward driving carrier torque on the carrier 216 is distributed through the clutch 228 and through the overrunning coupling 240 to the output carrier of the differential gear unit 244. The reverse driving torque on the ring gear 210 is distributed through engaged clutch 232 to the sun gear 222. Gear unit 208 multiplies this torque with overrunning brake 236 acting as a reaction point. The direction of the motion of the ring gear is opposite to the driving direction of the sun gear 222 so that the differential gear unit receives the combined torques of the shaft 226 and the ring gear 218.

To establish a ratio shift to the intermediate speed-ratio, clutch 225 is applied. This causes carrier 216 to become anchored through the clutches 228 and 225 and the overrunning brake 236. Carrier 216 now acts as a reaction member as gear unit 208 reverses the direction of the motion of sun gear 214. The ring gear torque on the ring gear 210 is transferred through engaged clutch 232 to the sun gear 222. With the carrier 224 acting as a reaction member, the ring gear 218 and the carrier of the differential gear unit 244 are driven in the forward driving direction.

To cause the mechanism to assume a third speed-ratio condition, clutch 225 again is released. Brake 234 is applied thereby allowing the ring gear 210 to act as a reaction member. Carrier 216 now is a power output element, its output torque being distributed through clutch 228 to the sleeve shaft 226, and hence through the overrunning coupling 240 to the differential gearing. Gear unit 208 performs no function at this time.

To achieve a ratio change to the fourth speed ratio clutch 225 again is applied and brake 234 remains applied. Sun gear 222 now acts as a reaction member since it is anchored by a brake 234 through the clutch 232. Ring gear 218 now is overspeeded as torque is distributed to the carrier 224.

Reverse drive is achieved by engaging brake 234 and brake 238. Clutch 230 is applied and the other clutches are released. With the ring gear 210 acting as a reaction member, carrier 216 is driven at a reduced speed ratio in a forward driving direction by the sun gear 214. Its motion is transferred through clutch 230 to the sun gear 222. Carrier 224 acts as a reaction member and the gear unit 208 thus reverses motion of the ring gear 218. Ring gear 218 drives the input carrier of the differential gear unit 244.

The torque ratios for each of the above-described driving conditions is represented analytically as follows:

$$\text{1st ratio} = \left(1+\frac{R1}{S1}\right)+\frac{R1}{S1}\left(\frac{R2}{S2}\right)$$

$$\text{2nd ratio} = \frac{R1}{S1}\left(\frac{R2}{S2}\right)$$

$$\text{3rd ratio} = \left(1+\frac{R1}{S1}\right)$$

$$\text{4th ratio} = \left(1+\frac{R1}{S1}\right)\left(\frac{1}{1+\frac{S2}{R2}}\right)$$

$$\text{Rev.} = -\left(1+\frac{R1}{S1}\right)\left(\frac{R2}{S2}\right)$$

In FIGURE 6 I have shown another embodiment of my invention which is characterized by a radial disposition of the elements of the two planetary gear units. This provides a minimum axial dimension of the transmission. Like the FIGURE 5 construction, however, it is capable of providing four forward driving speed-ratios and a single reverse speed-ratio. It is characterized also by non-synchronous ratio shifts as in the FIGURE 5 construction. The elements of the FIGURE 6 construction have a counterpart in the FIGURE 2 construction have been designated by similar reference characters although double prime notations have been added.

The two simple planetary gear units of FIGURE 6 comprise gear units 246 and gear unit 248. The ring gear 250 for the gear unit 246 forms also the sun gear for the gear unit 248. This is done by forming external gear teeth as well as internal gear teeth on the common portions of the gear element. Gear unit 246 includes also a sun gear 252, carrier 254 and planetary pinions 256 which are journalled on the carrier 254. Gear unit 248 includes ring gear 258, carrier 260 and planetary pinions 262 journalled rotatably on the carrier 260.

The sun gear and the ring gear element 250 can be anchored by friction brake 264 during operation in the third speed-ratio and the fourth speed-ratio. An overrunning brake 266 is adapted to anchor the carrier 260 during operation in the first speed-ratio and the second speed-ratio. The outer race 268 of the brake 266 can be released and applied selectively by friction brake 270. When the brake 270 is applied, overrunning brake 266 is capable of distributing torque to the relatively stationary transmission housing in one direction while freewheeling motion in the opposite direction is permitted. When brake 270 is released, overrunning brake 266 is rendered inactive.

Ring gear 258 is anchored selectively to the housing by reverse brake 272 during reverse drive operation. The overrunning brake 266 has a complementary friction brake 274 which is useful during hill braking operation in the first speed-ratio and in the fourth speed-ratio.

Ring gear 258 can be clutched to the input element of the differential gearing unit 244″ by means of a selectively engageable friction clutch 276 during operation in each of the four forward-driving speed-ratios. Carrier 254 is connected drivably to the power input element 278 of the differential gear unit 244″ by means of an overrunning coupling 280. The coupling is effective during operation in the third speed-ratio and in the first speed-ratio but is inactive at other times. The outer race 282 of the overrunning coupling 280 is adapted to be connected selectively to carrier 260 by selectively engageable friction clutch 284 during operation in the second speed-ratio, the fourth speed-ratio and the reverse drive ratio. Hill braking operation in the first speed-ratio and in the third speed-ratio is achieved by engaging selectively engageable clutch 286, which connects the race 282 with the input element of the differential gear unit 244.″

During forward drive operation in the lowest speed-ratio, torque is delivered to the sun gear 252. The carrier 254 resists rotation since it is drivably coupled to the ring gear of the differential gear unit 244″. The torque of the carrier 254, however, drives the differential gear unit 244″ in a forward driving direction. Gear element 250 is driven in a reverse direction relative to the direction of rotation of the sun gear 252. Carrier 260, however, is anchored by the overrunning brake 266 since brake 270 is applied. Ring gear 258 then is driven in a forward driving direction. Clutch 276, which is applied during operation in each of the four forward driving speed-ratios, delivers ring gear torque of ring gear 258 to the differential gear unit 244″. A split torque delivery path is established.

To effect a ratio change from the low speed-ratio to the second speed-ratio, clutch 284 is applied. This causes the carrier 254 to become anchored against the overrunning brake 266 since the clutch 284 connects directly the inner race of the brake 266 with the carrier 254. The gear element 250 then is rotated in a reverse direction at an increased speed. The resulting ring gear motion of ring gear 258 is distributed to the differential gear unit 244″ at an increased speed. Only a single torque delivery path is established in this instance.

To effect a ratio change from the second speed-ratio to the third speed-ratio, clutch 284 again is released. This renders overrunning coupling 280 effective to distribute again torque from carrier 254 to the differential carrier. The gear element 250 is applied by brake 264. Gear unit 246 thus is the sole torque multiplier since gear unit 248 has no function at this time. The carrier torque of carrier 254 is distributed directly to the differential gear unit.

Fourth speed-ratio operation is achieved by again engaging clutch 284 and keeping brake 264 applied. The motion of ring gear 254 now is multiplied by the gear unit 248 so that the ring gear 258 is overspeeded. The motion of ring gear 258 then is transferred through the engaged clutch 276 to the differential gear unit. Coupling 280 freewheels under these conditions.

The freewheeling characteristic of the brake 268 and the clutch 280 can be overcome during hill braking operation by the clutches 274 and 286, respectively. Clutch 286, however, is required also during reverse drive. This clutch, as well as the brake 272, are applied during reverse drive. Clutch 284 also is applied although the other clutches and brakes are released.

An analytical representation of the torque ratios that are available during the various drive conditions is set forth as follows:

$$1\text{st ratio} = \left(1 + \frac{R1}{S1}\right) + \frac{R1}{S1}\left(\frac{R2}{S2}\right)$$

$$2\text{nd ratio} = \frac{R1}{S1}\left(\frac{R2}{S2}\right)$$

$$3\text{rd ratio} = \left(1 + \frac{R1}{S1}\right)$$

$$4\text{th ratio} = \left(1 + \frac{R1}{S1}\right)\left(\frac{1}{1 + \frac{S2}{R2}}\right)$$

$$\text{Rev.} = \left(1 + \frac{R1}{S1}\right) - \frac{R1}{S1}\left(1 + \frac{R2}{S2}\right)$$

Having thus described preferred embodiments of my invention, what I claim and desire to secure by U.S. Letters Patent is:

1. In a driveline for an automotive vehicle, an internal combustion engine having a rotary crankshaft, a hydrokinetic unit having a bladed impeller and a bladed turbine situated in toroidal fluid flow relationship, said impeller being connected directly to and forming a part of said crankshaft, a turbine sleeve shaft, a gear unit situated adjacent said hydrokinetic unit including planetary gear elements comprising a reaction member, a power input member and a driven member, a differential gear unit comprising a carrier, planet pinions carried by said carrier, two differential side gears engageable with said pinions, a first driven shaft connected to one side gear and extending in one direction along the axis of said hydrokinetic unit, a second driven shaft connected to the other side gear and extending through said sleeve shaft, the power input member of said gear unit being connected to said sleeve shaft, said crankshaft being formed with an internal, axially-extending opening, said second driven shaft extending through said crankshaft opening, and clutch and brake means for controlling the relative motion of the elements of said gear unit to establish either one of two forward driving speed-ratios.

2. The combination as set forth in claim 1 wherein said turbine is situated at a location intermediate said crankshaft and said impeller.

3. The combination as set forth in claim 1 wherein said engine comprises a plurality of piston rods, a crank portion formed on said crankshaft, said piston rods having an eyelet portion encircling said crank portion, said second driven shaft extending through said crankshaft at a location directly adjacent the inner peripheral margin of said eyelet portion, said crank portion being formed with a discontinuity through which said second driven shaft extends whereby the transverse dimension of said engine relative to the axis of the crankshaft is reduced to a minimum.

4. The combination as set forth in claim 1 wherein said gear unit comprises a pair of simple planetary gear units situated in axially-spaced relationship, each gear unit comprising a ring gear, a sun gear, planet pinions engageable with said sun and ring gears and a carrier journalling said planet pinions, the sun gear of the first of said gear units being connected to said turbine, clutch means for connecting the sun gear of the second of said gear units with the ring gear of the first of said gear units, the carrier of said second gear unit being connected to the power input element of said differential gear unit, the ring gear of said sun gear unit being connected directly to the carrier of said first gear unit, clutch means for connecting together elements of said second gear unit during high speed ratio operation, and means for selectively braking the ring gear of said first gear unit to establish torque reaction during forward drive operation and reverse brake means for selectively anchoring the carrier of said first gear unit to establish reverse drive operation.

5. The combination as set forth in claim 2 wherein said gear unit comprises a pair of simple planetary gear units situated in axially spaced relationship, each gear unit comprising a ring gear, a sun gear, planet pinions engageable with said sun and ring gears and a carrier journalling said planet pinions, the sun gear of the first of said gear units being connected to said turbine, clutch means for connecting the sun gear of the second of said gear units with the ring gear of the first of said gear units, the carrier of said second gear unit being connected to the power input element of said differential gear unit, the ring gear of said sun gear unit being connected directly to the carrier of said first gear unit, clutch means for connecting together elements of said second gear unit during high speed ratio operation, and means for selectively braking the ring gear of said first gear unit to establish torque reaction during forward drive operation and reverse brake means for selectively anchoring the carrier of said first gear unit to establish reverse drive operation.

6. The combination as set forth in claim 3 wherein said gear unit comprises a pair of simple planetary gear units situated in axially spaced relationship, each gear unit comprising a ring gear, a sun gear, planet pinions engageable with said sun and ring gears and a carrier journalling said planet pinions, the sun gear of the first of said gear units being connected to said turbine, clutch means for connecting the sun gear of the second of said gear units with the ring gear of the first of said gear units, the carrier of said second gear unit being connected to the power input element of said differential gear unit, the ring gear of said sun gear unit being connected directly to the carrier of said first gear unit, clutch means for connecting together elements of said second gear unit during high speed ratio operation, and means for selectively braking the ring gear of said first gear unit to establish torque reaction during forward drive operation and reverse brake means for selectively anchoring the carrier of said first gear unit to establish reverse drive operation.

7. The combination as set forth in claim 6 wherein the clutch means for connecting the sun gear of said second gear unit and the ring gear of said first unit comprises a pressure operated friction clutch engageable during reverse drive and adaptable for torque delivery in either direction, and an overrunning coupling in parallel relationship with respect to said reverse clutch for accommodating delivery of the driving torque of the ring gear of said first unit to sun gear of said second unit during low speed ratio operation.

8. The combination as set forth in claim 1 wherein said gear unit comprises a pair of simple planetary gear units adaptable for forward drive operation in any of four forward driving speed-ratios and a single reverse speed-ratio, planet pinions engageable with said sun and ring gear and a carrier for journalling said planet pinions, first clutch means for connecting drivably the ring gear of said first gear unit to the sun gear unit of said second gear unit during operation in each of the four forward driving speed-ratios, a sleeve shaft encircling said second driven shaft, selectively engageable clutch means for connecting the carrier of said first gear unit to said sleeve shaft during operation in each of the four forward driving speed-ratios, clutch means for connecting said sleeve shaft to the power input member of said differential gear unit during operation in the first speed-ratio and the third speed-ratio, other clutch means for connecting selectively said sleeve shaft and the carrier of said second gear unit, reverse clutch means for connecting the carrier of said first gear unit and the sun gear of said second gear unit during reverse drive operation, and brake means for anchoring the ring gear of said first gear unit during third speed-ratio operation, fourth speed-ratio operation and reverse drive operation.

9. The combination as set forth in claim 2 wherein said gear unit comprises a pair of simple planetary gear units adaptable for forward drive operation in any of four forward driving speed-ratios and a single reverse speed-ratio, planet pinions engageable with said sun and ring gear and a carrier for journalling said planet pinions, first clutch means for connecting drivably the ring gear of said first gear unit to the sun gear unit of said second gear unit during operation in each of the four forward driving speed-ratios, a sleeve shaft encircling said second driven shaft, selectively engageable clutch menas for connecting the carrier of said first gear unit to said sleeve shaft during operation in each of the four forward driving speed ratios, clutch means for connecting said sleeve shaft to the power input member of said differential gear unit during operation in the first speed-ratio and the third speed-ratio, other clutch means for connecting selectively said sleeve shaft and the carrier of said second gear unit, reverse clutch means for connecting the carrier of said first gear unit and the sun gear of said second gear unit during reverse drive operation, and brake means for anchoring the ring gear of said first gear unit during third speed-ratio operation, foutrh speed-ratio operation and reverse drive operation.

10. The combination as set forth in claim 3 wherein said gear unit comprises a pair of simple planetary gear units adaptable for forward drive operation in any of four forward driving speed-ratios and a single reverse speed-ratio, planet pinions engageable with said sun and ring gear and a carrier for journalling said planet pinions, first clutch means for connecting drivably the ring gear of said first gear unit to the sun gear unit of said second gear unit during operation in each of the four forward driving speed-ratio, a sleeve shaft encircling said second driven shaft, selectively engageable clutch means for connecting the carrier of said first gear unit to said sleeve shaft during operation in each of the four forward driving speed-ratio, clutch means for connecting said sleeve shaft to the power input member of said differential gear unit during operation in the first speed-ratio and the third speed-ratio, other clutch means for connecting selectively said sleeve shaft and the carrier of said second gear unit, reverse clutch means for connecting the carrier of said first gear unit and the sun gear of said second gear unit during reverse drive operation, and brake means for anchoring the ring gear of said first gear unit during third speed-ratio operation, fourth speed-ratio operation and reverse drive operation.

11. The combination as set forth in claim 1 wherein said gear unit comprises a pair of simple planetary gear units with gear elements arranged transversely for rotation in a common plane, each gear unit comprising a ring gear, a sun gear, planet pinions engageable with said ring and sun gears and a carrier journalling rotatably said planet pinions, the ring gear of one gear unit and the sun gear of the second gear unit being a common element, the sun gear of said one gear unit being connected to said turbine, means for anchoring the carrier of said second gear unit during operation in the first speed-ratio and the second speed-ratio, means for anchoring said common gear element during operation in the third speed-ratio and the fourth speed-ratio, selectively engageable clutch means for connecting the carrier of said second gear unit and the power input member of said differential gear unit during operation in second speed-ratio, the fourth speed-ratio and the reverse drive, overrunning coupling means for connecting the carrier of said first gear unit and the power input member of said differential gear unit during operation in the third speed-ratio and the first speed-ratio whereby torque is delivered to said differential gear unit in one direction only, third clutch means for connecting directly the ring gear of said second gear unit and the power input member of said differential gear unit, and reverse drive clutch means for connecting the carrier of said first gear unit and the differential gear unit during reverse drive operation.

12. The combination as set forth in claim 2 wherein said gear unit comprises a pair of simple planetary gear units with gear elements arranged transversely for rotation in a common plane, each gear unit comprising a ring gear, a sun gear, planet pinions engageable with said ring and sun gears and a carrier journalling rotatably said planet pinions, the ring gear of one gear unit and the sun gear of the second gear unit being a common element, the sun gear of said one gear unit being connected to said turbine, means for anchoring the carrier of said second gear unit during operation in the first speed-ratio and the second speed-ratio, means for anchoring said common gear element during operation in the third speed-ratio and the fourth speed-ratio, selectively engageable clutch means for connecting the carrier of said second gear unit and the power input member of said differential gear unit during operation in second speed-ratio, the fourth speed-ratio and the reverse drive, overrunning coupling means for connecting the carrier of said first gear unit and the power input member of said differential gear unit during operation in the third speed-ratio and the first speed-ratio whereby torque is delivered to said differential gear unit in one direction only, third clutch means for connecting directly the ring gear of said second gear unit and the power input member of said differential gear unit, and reverse drive clutch means for connecting the carrier of said first gear unit and the differential gear unit during reverse drive operation.

13. The combination as set forth in claim 3 wherein said gear unit comprises a pair of simple planetary gear units with gear elements arranged transversely for rotation in a common plane, each gear unit comprising a ring gear, a sun gear, planet pinions engageable with said ring and sun gears and a carrier journalling rotatably said planet pinions, the ring gear of one gear unit and the sun gear of the second gear unit being a common element, the sun gear of said one gear unit being connected to said turbine, means for anchoring the carrier of said second gear unit during operation in the first speed-ratio and the second speed-ratio, means for anchoring said common gear element during operation in the third speed-ratio and the fourth speed-ratio, selectively engageable clutch means for connecting the carrier of said second gear unit and the power input member of said differential gear unit during operation in second speed-ratio, the fourth speed-ratio and the reverse drive, overrunning coupling means for connecting the carrier of said first gear unit and the power input member of said differential gear unit during operation in the third speed-ratio and the first speed-ratio whereby torque is delivered to said differential gear unit in one direction only, third clutch means for connecting directly the ring gear of said second gear unit and the power input member of said differential gear unit, and reverse drive clutch means for connecting the carrier of said first gear unit and the differential gear unit during reverse drive operation.

References Cited

UNITED STATES PATENTS

| | | | |
|---|---|---|---|
| 2,913,927 | 11/1959 | Issigonis | 74—701 |
| 3,017,787 | 1/1962 | Payne | 74—701 |
| 3,150,543 | 9/1964 | Dangauthier | 74—700 |

ARTHUR T. McKEON, Primary Examiner

74—700